(12) United States Patent
Kumar et al.

(10) Patent No.: US 11,595,258 B2
(45) Date of Patent: Feb. 28, 2023

(54) OPTIMAL SOFTWARE LOAD DELIVERY SYSTEMS AND METHODS TO NETWORK ELEMENTS

(71) Applicant: Ciena Corporation, Hanover, MD (US)

(72) Inventors: Amit Kumar, Noida (IN); Magdalena Charbonneau, Ottawa (CA); Sobeer Kant Jain, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 177 days.

(21) Appl. No.: 16/885,420

(22) Filed: May 28, 2020

(65) Prior Publication Data

US 2021/0328871 A1 Oct. 21, 2021

(30) Foreign Application Priority Data

Apr. 15, 2020 (IN) .......................... IN202011016211

(51) Int. Cl.
| | |
|---|---|
| *H04L 41/08* | (2022.01) |
| *G06F 8/658* | (2018.01) |
| *G06F 8/61* | (2018.01) |
| *H04L 41/082* | (2022.01) |

(52) U.S. Cl.
CPC ............ *H04L 41/0883* (2013.01); *G06F 8/61* (2013.01); *G06F 8/658* (2018.02); *H04L 41/082* (2013.01)

(58) Field of Classification Search
CPC ... H04L 41/0883; H04L 41/082; G06F 8/658; G06F 8/61
See application file for complete search history.

(56) References Cited

U.S. PATENT DOCUMENTS

| | | |
|---|---|---|
| 6,880,086 B2 | 4/2005 | Kidder et al. |
| 6,883,169 B1 | 4/2005 | Guilbeault et al. |
| 6,930,890 B1 | 8/2005 | Branscomb |
| 7,051,097 B1 | 5/2006 | Pecina |
| 7,130,870 B1 | 10/2006 | Pecina et al. |
| 7,174,547 B2 | 2/2007 | Wang et al. |
| 7,437,469 B2 | 10/2008 | Ellanti et al. |
| 10,013,535 B2 | 7/2018 | Thomas et al. |
| 2016/0277234 A1* | 9/2016 | Amulothu ............ H04L 41/082 |
| 2017/0163732 A1* | 6/2017 | Saraf .................. H04L 67/1097 |
| 2017/0206034 A1* | 7/2017 | Fetik ....................... G06F 21/78 |
| 2017/0212487 A1* | 7/2017 | Gupta ..................... F24F 11/62 |
| 2019/0114223 A1 | 4/2019 | Pydipaty et al. |
| 2020/0026587 A1* | 1/2020 | Gupta ....................... G06F 8/60 |

* cited by examiner

*Primary Examiner* — Azizul Choudhury
(74) *Attorney, Agent, or Firm* — Baratta Law PLLC; Lawrence A. Baratta, Jr.

(57) ABSTRACT

Systems and methods include obtaining a catalog for a "to" software release and details of a controller of a network element operating a "from" software release, wherein the software releases are associated with the network element, and wherein the controller has a file system associated therewith; determining a delivery technique for a software load of the "to" software release based on the catalog and the details of the controller; and causing delivery of the software load to the file system based on the determined delivery technique, wherein the causing is one of automatic and subsequent to a user command. The delivery technique can be one of i) a full delivery, including all files in the catalog, ii) a minimal delivery, including only files in the catalog needed based on modules present in the network element, and iii) a hybrid delivery, between the full and minimal delivery.

20 Claims, 4 Drawing Sheets

OPTIMAL SOFTWARE LOAD DELIVERY SYSTEMS AND METHODS TO NETWORK ELEMENTS

FIELD OF THE DISCLOSURE

The present disclosure generally relates to networking. More particularly, the present disclosure relates to optimal software load delivery systems and methods to network elements.

BACKGROUND OF THE DISCLOSURE

Networks are realized with physical equipment, i.e., network elements, nodes, etc., that require periodic software upgrades, updates, etc. while deployed and operational. To upgrade a network element, the software release must be delivered to the network element file system first and stored thereon. Over time, the size of the software release is growing, sometimes unpredictably, making it challenging to accommodate the software release on a controller file system and increasing the release delivery time. As described herein, a controller is a processing device associated with a network element. A network element can be initially deployed at an early software release and with a controller having specific characteristics (i.e., memory, file system, processor, etc.). Over time, there can be multiple software releases with each release having a different load size, and usually with later releases having larger sizes. Also, as described herein, a legacy system refers to a network element that is deployed with an early software release and with a controller having limited capabilities in terms of available space for software, processing capabilities, etc. Legacy systems may be severely limited in terms of available space for release delivery, while more recent systems may have plenty of space. This requires different operations for delivering a software release to a network element, based on the type of network element, the card/modules present in the network element, the type and memory size of the controller, etc. A network operator, technician, engineer, etc. have to manually perform the delivery process, making the whole process cumbersome and error-prone. Additionally, different combinations of "from" and "to" loads (from being a current software release and to being an upgraded software release) may require further differentiation.

BRIEF SUMMARY OF THE DISCLOSURE

The present disclosure relates to optimal software load delivery systems and methods to network elements. The systems and methods automatically determine a software delivery approach based on several factors, such as the "to" release and the "from" release, catalog information, network element type, modules/cards present in the network element, etc. As such, the systems and methods provide a deterministic, stable, error-proof, and easy to operate approach for software delivery.

In an embodiment, a method and a non-transitory computer-readable storage medium includes computer readable code stored thereon for programming a processor to perform steps. Also, the steps can be implemented by a system that includes a processor and memory with instructions that, when executed, cause the processor to perform the steps. The steps include obtaining a catalog for a "to" software release and details of a controller of a network element operating a "from" software release, wherein the software releases are associated with the network element, and wherein the controller has a file system associated therewith; determining a delivery technique for a software load of the "to" software release based on the catalog and the details of the controller; and causing delivery of the software load to the file system based on the determined delivery technique, wherein the causing is one of automatic and subsequent to a user command. The delivery technique is one of i) a full delivery of the software load, including all files in the catalog, ii) a minimal delivery of the software load, including only files in the catalog needed based on modules present in the network element, and iii) a hybrid delivery of the software load between the full delivery and the minimal delivery, including the only files and extra files for modules not present in the network element.

The steps can further include, subsequent to an upgrade of the network element to the "to" software release and removal of the "from" software release from the file system, performing a second delivery of the software load with at least one file not delivered with the determined delivery technique. The hybrid delivery can be based on a service bundle where files in the catalog are provided based on modules used with the service bundle. The service bundle can be based on a type of the network element, including any of a switch, a router, and a photonic terminal. The catalog can be a file used to describe contents of the "to" software release with list of supported modules and defining what loads belong on the modules. The controller can be a type of a plurality of controller types, each type having a different size of the file system, and wherein the determining can be based in part on the corresponding size of the file system. The obtaining can performed by the network element or by any of a management system and a release server.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to optimal software load delivery systems and methods to network elements. The systems and methods automatically determine a software delivery approach based on several factors, such as the "to" release and the "from" release, catalog information, network element type, modules/cards present in the network element, etc. As such, the systems and methods provide a deterministic, stable, error-proof, and easy to operate approach for software delivery.

Network

Figure 1:
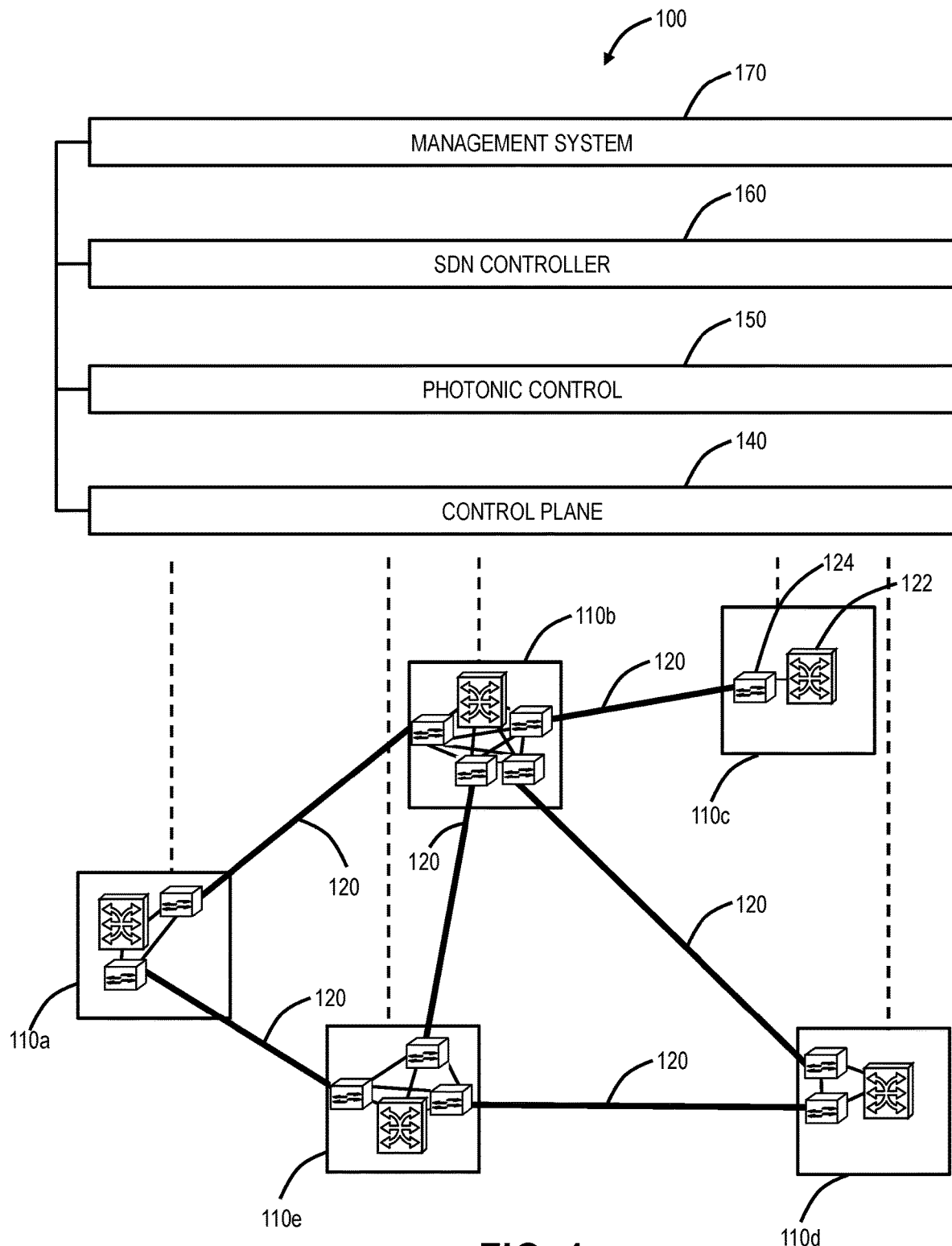
FIG. 1 is a network diagram of an example network with five interconnected sites.
Figure 2:
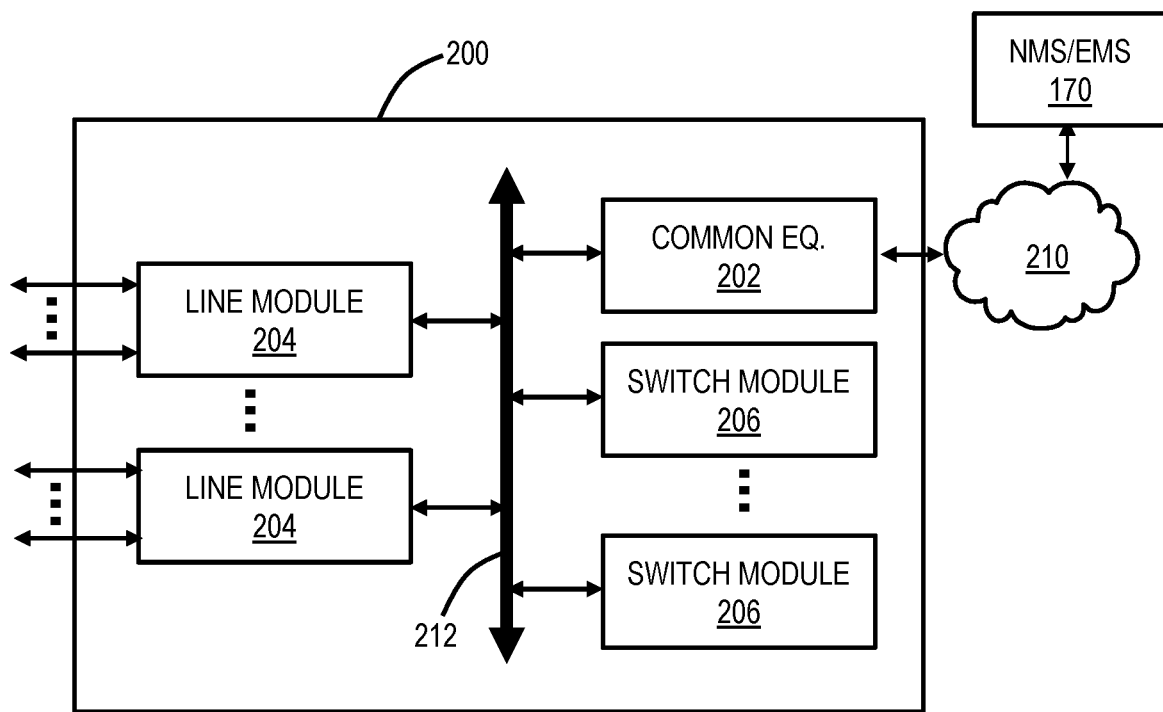
FIG. 2 is a block diagram of an example network element for use with the optimal software load delivery systems and methods described herein.

FIG. 1 is a network diagram of a network 100 with five interconnected sites 110a, 110b, 110c, 110d, 110e. The sites 110 are interconnected by a plurality of links 120, i.e., fiber spans. Those skilled in the art recognize a physical link 120 can include one or two optical fibers for bidirectional communication. Each of the sites 110 can include a switch 122 and one or more WDM network elements 124. The switch 122 is configured to provide services at Layers 1 (e.g., Optical Transport Network (OTN)) and/or Layer 2 (e.g., Ethernet, Multiprotocol Label Switching (MPLS)) and/or Layer 3 (e.g., Internet Protocol (IP)) where the switch would normally be called a router. For simplicity of disclosure herein, it will be referred to as a switch in all cases. The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of skill in the art will recognize that the switch 122 and the WDM network elements 124 may be realized in the same network element, and the switch 122 and the WDM network element 124 may be implemented as a network element 200, as illustrated in FIG. 2. For example, a switch 122 can include pluggable transceivers that provide DWDM. The photonic layer and the photonic control operating thereon can also include intermediate amplifiers and/or regenerators on the links 120, which are omitted for illustration purposes. The network 100 is illustrated, for example, as an interconnected mesh network, and those of skill in the art will recognize the network 100 can include other architectures, with additional sites 110 or with fewer sites, with additional network elements and hardware, etc. Of note, the network 100 is presented to illustrate an example network with network elements (e.g., the switches 122 and the WDM network elements 124) that can utilize the optimal software load delivery systems and methods described herein. Other networks are also contemplated.

The sites 110 communicate with one another optically over the links 120. The sites 110 can be network elements which include a plurality of ingress and egress ports forming the links 120. Further, the nodes 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 includes a control plane 140 operating on and/or between the switches 122 at the sites 110a, 110b, 110c, 110d, 110e. The control plane 140 includes software, processes, algorithms, etc. that control configurable features of the network 100, such as automating the discovery of the switches 122, the capacity of the links 120, port availability on the switches 122, connectivity between ports; dissemination of topology and bandwidth information between the switches 122; calculation and creation of paths for connections; network-level protection and restoration; and the like. In an embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100, and the control plane 140 can utilize any type of control plane for controlling the switches 122 and establishing connections.

The network 100 can include photonic control 150, which can be viewed as a control algorithm/loop for managing wavelengths/optical spectrum from a physical perspective at Layer 0. In one aspect, the photonic control 150 is configured to add/remove wavelengths/spectrum from the links in a controlled manner to minimize impacts to existing, in-service wavelengths. For example, the photonic control 150 can adjust modem launch powers, optical amplifier gain, Variable Optical Attenuator (VOA) settings, Wavelength Selective Switch (WSS) parameters, etc. The network 100 can also include a Software-Defined Networking (SDN) controller 160 and a management system 170. SDN allows the management of network services through abstraction of lower-level functionality. This is done by decoupling the system that makes decisions about where traffic is sent (SDN control through the SDN controller 160) from the underlying systems that forward traffic to the selected destination (i.e., the physical equipment in the network 100). SDN calls for the ability to centrally program provisioning of forwarding on the network 100 for more flexible and precise control over network resources to support new services. The SDN controller 160 is a processing device that has a global view of the network 100. Additionally, the SDN controller 160 can include or connect to SDN applications which can utilize the data from the SDN controller 160 for various purposes.

There are various techniques for data communications between the switches 122, the WDM network elements 124, the control plane 140, the photonic control 150, the SDN controller 160, and the management system 170 for Operations, Administration, Maintenance, and Provisioning (OAM&P purposes. These various techniques can include one or more of Optical Service Channels (OSCs), overhead communication channels, in-band communication channels, and out-of-band communication channels. OSCs are dedicated wavelengths between WDM network elements 124. The overhead communication channels can be based on SONET, SDH, or OTN overhead, namely the Data Communication Channel (DCC) or General Communication Channel (GCC). The in-band communications channels and the out-of-band communication channels can use various protocols. Collectively, these techniques for an OAM&P communications network over in the network 100. The OAM&P communications network may employ switching and/or routing protocols to provide resilient communications to all network elements 122, 124 in the event of a failure (e.g., fiber cut or equipment failure).

In an embodiment, the network elements 200, such as the switches 122 and/or the network elements 124), are configured to communicate with one another in the network 100 to operate the control plane 140 for control plane signaling. In another embodiment, the network elements 200 are configured to communicate with one another and with the SDN controller 160, the management system 170, etc. Any of this communication may be either in-band or out-of-band. In-band generally means via overhead or the like, whereas out-of-band generally means via a separate network. For SONET networks and similarly for SDH networks, the switches 122 and/or network elements 124 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the switches 122 and/or network elements 124 can include an in-band signaling mechanism utilizing OTN overhead. The General Communication Channels (GCC) defined by ITU-T Recommendation G.709 are in-band side channels used to carry transmission management and signaling information within Optical Transport Network elements.

The management system 170 can be a processing device that supports OAM&P functions for the network 100, including software delivery to the network elements. The management system 170 can be referred to as a Network Management System (NMS), an Element Management System (EMS), a Craft Interface (CI), etc. The management system can connect directly to the switches 122 and/or network elements 124, as well as connect through any of the control plane 140, the photonic control 150, the SDN controller 160, etc. The management system 170 is configured to provide a Graphical User Interface (GUI) for implementing software delivery, as described herein. Of course, the control plane 140, the SDN controller, and other processing devices are also contemplated for implementing the software delivery, as described herein.

Example Network Element/Node

FIG. 2 is a block diagram of an example network element 200 for use with the optimal software load delivery systems and methods described herein. In an embodiment, the network element 200 can be a device that may consolidate the functionality of a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation. In another embodiment, the network element 200 can be any of an OTN Add/Drop Multiplexer (ADM), a Multi-Service Provisioning Platform (MSPP), a Digital Cross-Connect (DC S), an optical cross-connect, a POTS, an optical switch, a router, a switch, a WDM/DWDM terminal, an access/aggregation device, etc. That is, the network element 200 can be any digital and/or optical system with ingress and egress digital and/or optical signals and switching of channels, timeslots, tributary units, wavelengths, etc. For example, switch 122 and/or the WDM network element 124 can be implemented as the network element 200.

Figure 3:
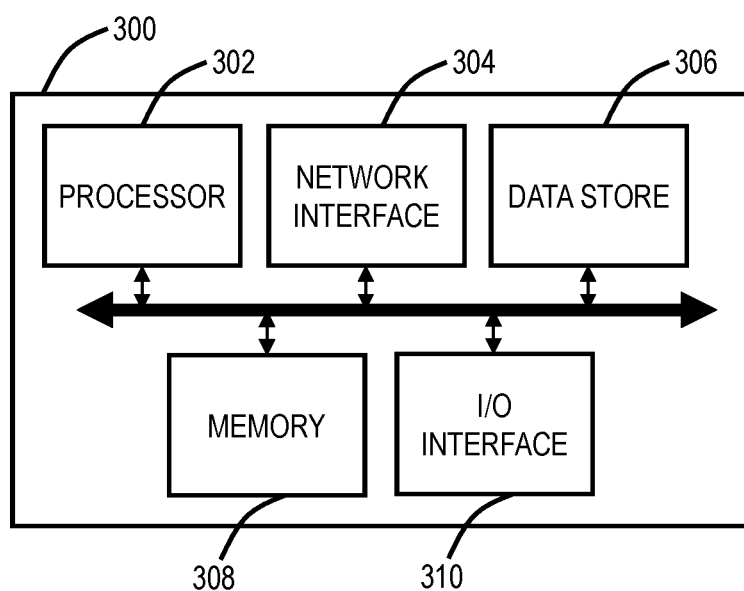
FIG. 3 is a block diagram of a controller that can form a controller or control module for the network element of FIG. 2, as well as a processing device for realizing the SDN controller, the management system, or the like, in the network of FIG. 1.

In an embodiment, the network element 200 includes common equipment 202, one or more line modules 204, and one or more switch modules 206. The common equipment 202 can include power; a control module such as a controller 300, as illustrated in FIG. 3; OAM&P access; user interface ports; and the like. The common equipment 202 can connect to the management system 170 through a data communication network 210 (as well as the SDN controller 160, etc.). Additionally, the common equipment 202 can include a controller, a shelf processor, a control plane processor, etc. such as a controller 300 illustrated in FIG. 3. The network element 200 can include an interface 212 for communicatively coupling the common equipment 202, the line modules 204, and the switch modules 206 to one another. For example, the interface 212 can be a backplane, midplane, a bus, optical and/or electrical connectors, or the like. The line modules 204 are configured to provide ingress and egress to the switch modules 206 and to external connections on the links to/from the network element 200. In an embodiment, the line modules 204 can form ingress and egress switches with the switch modules 206 as center stage switches for a three-stage switch, e.g., a three-stage Clos switch. Other configurations and/or architectures are also contemplated.

Further, the line modules 204 can include a plurality of optical connections per module, and each module may include a flexible rate support for any type of connection. The line modules 204 can include WDM interfaces, short-reach interfaces, and the like, and can connect to other line modules 204 on remote network elements, end clients, edge routers, and the like, e.g., forming connections on the links in the network 100. From a logical perspective, the line modules 204 provide ingress and egress ports to the network element 200, and each line module 204 can include one or more physical ports. The switch modules 206 are configured to switch channels, timeslots, tributary units, packets, etc. between the line modules 204. For example, the switch modules 206 can provide wavelength granularity (Layer 0 switching); OTN granularity; Ethernet granularity; and the like. Specifically, the switch modules 206 can include Time Division Multiplexed (TDM) (i.e., circuit switching) and/or packet switching engines. The switch modules 206 can include redundancy as well, such as 1:1, 1:N, etc.

The network element 200 can include a chassis (shelf) where the equipment 202 and the modules 204, 206 are realized as cards, modules, circuit packs, blades, etc. As described herein, the term module is used to represent all of these hardware devices. Here, a module is physically inserted in the chassis and connected to the interface 212. The network element 200 is illustrated with the line modules 204 and the switch modules, as well as the controller 300, that can be a control module. Other types of modules are also contemplated. Further, there can be a variety of different types of line modules 204 and switch modules 206. Examples of types of modules 204, 206 can include coherent transceivers, transponders, and muxponders (a muxponder is a combination of a multiplexer and a transponder having N client interfaces and M line interfaces, N>M); Ethernet interface modules; OTN interface modules; non-coherent transceivers, transponders, and muxponders; pluggable modules; SONET/SDH interface modules; packet switches; OTN switches; amplifier modules; Reconfigurable Optical Add/Drop Multiplexer (ROADM) modules; control modules; Optical Service Channel (OSC) modules; and the like. Those of ordinary skill in the art will recognize this list is merely presented for illustration purposes, and there can be various other types of modules.

Also, those of ordinary skill in the art will recognize the network element 200 can include other components which are omitted for illustration purposes, and that the systems and methods described herein are contemplated for use with a plurality of different network elements with the network element 200 presented as an example type of network element. For example, in another embodiment, the network element 200 may not include the switch modules 206, but rather have the corresponding functionality in the line modules 204 (or some equivalent) in a distributed fashion. Also, the network element 200 may omit the switch modules 206 and that functionality, such as in the WDM network element 124. For the network element 200, other architectures providing ingress, egress, and switching are also contemplated for the systems and methods described herein. In a further embodiment, the chassis and modules may be a single integrated unit, namely a rack-mounted shelf where the functionality of the modules 204, 206 is built-in, i.e., a "pizza-box" configuration.

Note, the network element can be configured as a single "shelf" or multiple "shelves." Those of ordinary skill in the art will recognize the term shelf can refer to a chassis, a rack-mounted unit (pizza box), etc. A network element, i.e., a node, is a single entity from a network management, OAM&P, etc. perspective. Here, a network element may include one or more shelves, with each shelf having its own controller 300. In the multiple shelf configuration, one shelf can be designated as a primary shelf (or master), and other shelves can be configured as member shelves (or slaves).

The present disclosure relates to software release delivery to the network element 200, via the controller 300 (or control module) associated with the network element 200. During software release delivery, in a multiple shelf configuration, the software release is delivered to the primary shelf first, and then the software release is delivered to member shelves from the primary shelf, i.e., the primary shelf acts as a release server for member shelves.

Importantly, a software release upgrade requires different software for different types of modules. That is, if all modules are present (or expect to be present), a software release delivery would have to provide a full load, i.e., all of the software for all of the modules. This approach is referred to herein as a full delivery. If only some modules are present, the software release delivery would have to provide a minimal load, i.e., only the software for the present modules. This approach is referred to herein as a minimal delivery. Of course, there can be a middle ground or hybrid approach between the full delivery and the minimal delivery, such as a so-called service bundle were the minimal delivery occurs plus software for modules that are expected to be included in the network element 200, but are not yet equipped.

As is described herein, the present disclosure provides a process for software release delivery in an optimal manner, namely considering the capabilities of the network element 200, the modules present, the modules expected, the controller 300 capabilities, and the like.

Example Controller

FIG. 3 is a block diagram of a controller 300 which can form a controller or control module for the network element 200, as well as a processing device for realizing the SDN controller 160, the management system 170, or the like. The controller 300 can be part of the common equipment, such as common equipment 202 in the network element 200, or a stand-alone device communicatively coupled to the network element 200 via the data communication network 210. Further, the controller 300 can be referred to in implementations as a control module, a shelf controller, a shelf processor, a system controller, etc. As described herein, the controller 300 is meant to cover any processing device that is used to control the operation of a network element 200, including software release delivery. The controller 300 can include a processor 302 which is a hardware device for executing software instructions such as operating the control plane 140. The processor 302 can be any custom made or commercially available processor, a central processing unit (CPU), an auxiliary processor among several processors associated with the controller 300, a semiconductor-based microprocessor (in the form of a microchip or chipset), or generally any device for executing software instructions. When the controller 300 is in operation, the processor 302 is configured to execute software stored within the memory, to communicate data to and from the memory, and to generally control operations of the controller 300 pursuant to the software instructions. The controller 300 can also include a network interface 304, a data store 306, memory 308, an I/O interface 310, and the like, all of which are communicatively coupled to one another and to the processor 302.

The network interface 304 can be used to enable the controller 300 to communicate on the Data Communication Network (DCN) 210, such as to communicate control plane information to other controllers, to the management system 170, to the SDN controller 160, and the like. The network interface 304 can include, for example, an Ethernet module. The network interface 304 can include address, control, and/or data connections to enable appropriate communications on the network. The data store 306 can be used to store data, such as control plane information, provisioning data, OAM&P data, etc. The data store 306 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 306 can incorporate electronic, magnetic, optical, and/or other types of storage media. The memory 308 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 308 may incorporate electronic, magnetic, optical, and/or other types of storage media. Note that the memory 308 can have a distributed architecture, where various components are situated remotely from one another, but may be accessed by the processor 302. The I/O interface 310 includes components for the controller 300 to communicate with other devices. Further, the I/O interface 310 includes components for the controller 300 to communicate with the other nodes, such as using overhead associated with OTN signals, an Optical Service Channel (OSC), etc.

In an embodiment, the controller 300 is configured to implement software, processes, algorithms, etc. that can control configurable features of the network 100, such as automating the discovery of the network elements 200, capacity on the links 120, port availability on the network elements 200, connectivity between ports; dissemination of topology and bandwidth information between the network elements 200; path computation and creation for connections; network-level protection and restoration; and the like. As part of these functions, the controller 300 can include a topology database that maintains the current topology of the network 100, such as based on control plane signaling and a connection database that maintains available bandwidth on the links again based on the control plane signaling as well as management of the network risks for diverse path computation.

Software Releases on the Network Elements

The network 100 can include various different types of network elements 200 and the network elements 200 can include various different types of controllers 300. For example, a network 100 may be deployed with the network elements 200 at an early software release (e.g., Release 1, 2, 3, etc.) and the network 100 may operate for years where the network elements 200 are upgraded to later software releases (e.g., 4, 5, 6, 7, etc.). There are two aspects to note—1) later software releases include a larger size, more features, more functionality, additional hardware module support, etc., and 2) the older controllers 300 have a fixed amount of memory, a fixed file system, a fixed processor, etc. As described herein, the term file system is used to refer to the physical storage on the controller 300. Also, the file system does not necessarily have to be on the controller 300, and can be located elsewhere in the network element 200. That is, the file system is associated with the network element 300 and this disclosure contemplates any implementation. As is known in the art, a file system encompasses how data is stored and retrieved on the physical data store 306. The data store 306 can be any physical medium, such as flash memory. Further, the file system can be anything known in the art, and a fundamental limitation addressed herein in terms of the file system is size.

The network 100 grows over time as new equipment, routes, and services are added. For example, the network 100 can include similar categories of network elements 200 on the same software releases, but the network elements 200 can have different capabilities, such as in terms of the controller 300. One network element 200 may have a new, up-to-date controller 300, whereas another network element 200 may have an older, legacy controller 300 with less memory and file storage space. As described herein, this aspect is described as a network 100 with different network element 200 types. Here, the network elements 200 all use the same software load and release, but the network elements 200 are referred to as being different types because of their hardware capabilities for the controller 300 being different.

To manage networks with different network element 200 types, operators have to perform software release deliveries with different options on each network element 200, making the whole process cumbersome and error-prone. Additionally, different combinations of "from" and "to" loads may require further differentiation, making things even more difficult to document and explain to the customer concisely. As described herein, "from" means a current software release, usually denoted are a version number, e.g., release 4.3, etc. "To" means a software release that the "from" software release is being updated to, e.g., release 5.0, etc. The aspect of different combinations means the network 100 can have network elements 200 at different "from" releases as well as network elements 200 going to different "to" releases.

Software Catalog

Again, as described herein, there are three approaches for software delivery—minimal delivery, a service bundle, and a full delivery. As described herein, a software catalog for a given software release includes a mapping of which software loads are required for which modules present in a given network element 200. A software catalog, or simply a catalog, is defined for each "to" software release. The software catalog is similar to a manifest file, which is a file containing metadata for a group of accompanying files that are part of a set or coherent unit, namely the software release. For example, the files of a software release may have a manifest describing the name, version number, license, and the constituting files of the program. Stated differently, the catalog is a file that is used to describe the contents of the software release and the list of supported hardware (modules) in that release, as well defining what loads belong on which modules. In terms of catalog size, a full delivery may be on the order of 1-2 Gigabytes (Gb) whereas a minimal delivery may be on the order of hundreds of Megabytes (Mb).

The term software load (or simply "load") is used herein to represent software code for a software release. The software delivery approaches are defined as follows:

Minimal Delivery: here, the software implicitly checks which modules are present in the network element 200, it does a lookup of the software load required for those cards from a software catalog, and downloads only those for delivery.

Service Bundle: here, for a group of modules (present or not in a network element), the software looks up the catalog to transfer the load on for the selected group of modules. This is a hybrid approach between the minimal delivery and the full delivery in that it provides some loads for some modules that are not present, such as because there is a future expectation those modules may be included.

Full Delivery: here, the software downloads software for all (not just current installed) modules from the catalog. Unfortunately, this option is heavy on disk usage and is not always possible (especially on old controller 300 modules) as the release size is continuously growing.

In an embodiment, the aforementioned delivery options (full, service bundle, and minimal) are selected by a user (technician) performing software release delivery in advance of a software update.

The present disclosure further includes a new, fourth delivery option referred to as optimal delivery. Here, the aforementioned delivery options are automatically selected to deduce an optimal choice of loads that need to be transferred. The optimal delivery analyzes factors such as the type of hardware available in a network element 200 (e.g., the controller type), the modules present in the network element 200, any future growth expectations for the network element 200 (i.e., what modules may be included), a type of the network element 200 (e.g., this can be used to determine what module support is needed, e.g., a WDM network element may not need OTN or packet switching support), and the like. The optimal delivery determines which software loads to deliver from a "to" release catalog based on the various factors.

As described herein, a network element 200 can be a switch, a router, a WDM terminal, etc. A software release can cover an entire family of products, namely a switch, router, terminal, etc. One network element 200 may be configured as a switch, e.g., a Packet Optical Transport System (POTS), while another network element 200 in the same software release may be configured as a WDM terminal. Still further, another network element 200 in the same software release may be configured as a packet switch, an OTN switch, etc. With respect to the service bundle, each configuration may only need a subset of all the software release contents. The catalog can include various different service bundles based on the type of network element 200, such as, for example, WDM terminal, POTS, packet switch, OTN switch, ROADM node, etc.

Pre-Upgrade Software Delivery

A software release delivery can be performed from the management system 170 to the network element 200. A user can schedule the delivery and such delivery can be performed in or outside of a maintenance window. As is known in the art, a maintenance window is a pre-scheduled time when the network 100 is lightly utilized and where maintenance activities are performed. The thought is that any problems caused by the maintenance activities are minimized due to the light usage of the network. Typically, a maintenance window is late at night or early in the morning.

The management system 170 includes a GUI that can support software release delivery. From such GUI, a user can select the "to" release, the network elements 200, the delivery options (minimal, service bundle, full, optimal), and the timing.

The following description provides examples of pre-upgrade software delivery activities for different types of network elements 200. As described herein, pre-upgrade software delivery activities relate to providing the "to" release to the network element 200 and associated operations at the network element 200 in advance of the actual software upgrade. That is, the pre-upgrade software delivery activities are everything before the actual upgrade is performed.

For a standalone shelf system (network element 200), all unused (i.e., not running) software loads are deleted from the controller 300 file system. A minimal delete of the active "from" software release is performed on the controller 300 file system. If there is a redundant (protection) controller 300 present and provisioned, the active "from" software release is automatically removed from it as well. A minimal delete operation deletes all software loads from the file system except the software loads needed for the modules that are presently equipped. Software delivery is then performed based on the selected delivery technique—minimal, service bundle, full, or optimal.

For a multiple shelf system (network element 200), the same delete processes occur as in a standalone shelf system with the commands sent by the management system 170 to the primary shelf and all member shelves, or with the commands sent by the management system 170 to the primary shelf which in turn sends the commands to the member shelves. The software delivery can be from the management system 170 to the primary shelf's controller 300. In an embodiment, this can include a full delivery to the primary shelf s controller 300, and the primary shelf's controller 300 can perform the selected delivery technique—minimal, service bundle, full, or optimal—with the member shelf controllers 300. In another embodiment, the selected delivery technique—minimal, service bundle, full, or optimal—can be between the management system 170 and each of the primary shelf controller 300 and the member shelf controller 300. In a further embodiment, the selected delivery technique—minimal, service bundle, full, or optimal—can be just with the primary shelf controller 300, and it can then distribute to the member shelf controllers 300.

Optimal Software Delivery

Figure 4:
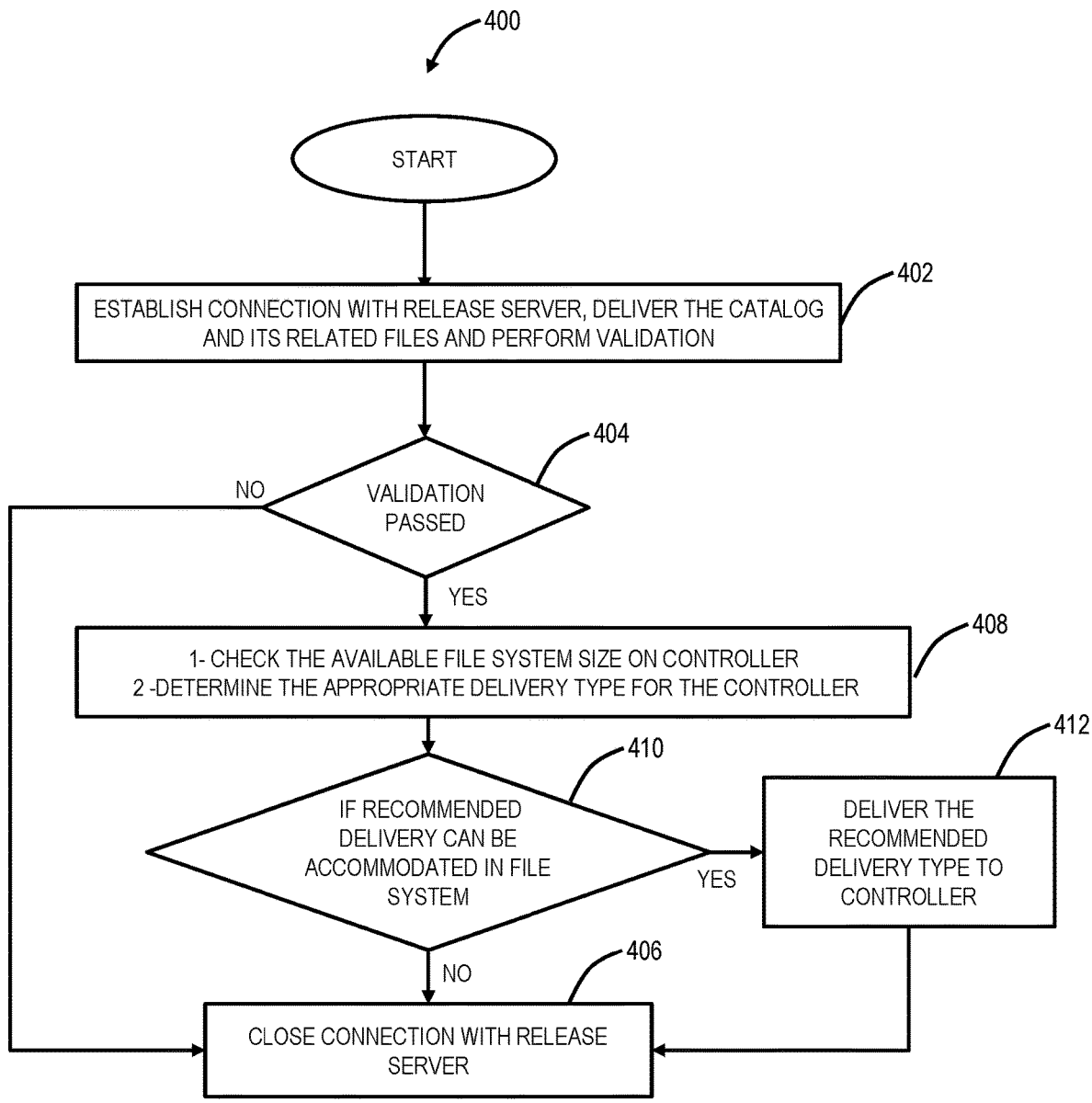
FIG. 4 is a flowchart of a process for software delivery to a network element in accordance with the systems and methods described herein.

FIG. 4 is a flowchart of a process 400 for software delivery to a network element 200 in accordance with the systems and methods described herein. The process 400 is implemented between a release server and one or more network elements 200 in a network 100. The release server can be the management system 170, a proxy server, or some other processing device whose purpose is to deliver the "to" software release to the network element with the optimal delivery technique.

For the optimal delivery, the process 400 includes analysis of factors such as the type of hardware available in a network element 200 (e.g., the controller type), the modules present in the network element 200, any future growth expectations for the network element 200 (i.e., what modules may be included), a type of the network element 200 (e.g., this can be used to determine what module support is needed, e.g., a WDM network element may not need OTN or packet switching support), and the like.

The decision can be made by the controller 300 in a network element 200 or by the release server based on feedback from the network element 200. The decision in the optimal delivery technique includes whether to provide a full delivery, a minimal delivery, or a service bundle in between the full delivery and the minimal delivery. The decision is based on the catalog of the software release being delivered, i.e., the "to" release. The optimal delivery allows flexibility in a new software release. Note, often, there is support for upgrades from several "from" releases, e.g., three or more. Here, it is challenging to forecast software delivery three releases or more in the future.

The process 400 includes an initial delivery of a "to" software catalog to the release server. Here, a connection is established with the release server (anything is contemplated including a flash drive, i.e., local delivery), and the catalog and the related files are delivered (step 402). Further, this step can include validation where it is determined whether or not the catalog and the related files were correctly delivered.

Next, the process 400 includes checking if the software catalog and catalog related files were properly delivered to the release server, i.e., if the validation passes (step 404). Various known techniques can be utilized to verify delivery. If the validation fails (step 404), the process 400 ends, namely the connection with the release server is closed (step 406).

If the validation is successful (step 404), the process 400 is able to download (delivery) the software release to a network element. Here, the process 400 is now illustrated with respect to a single network element 200, but those skilled in the art will recognize this can be repeated and/or batched for multiple network elements 200. The process 400 includes 1) a check of the available file system size on a controller 300, and 2) determines the appropriate delivery type for the controller, based on the file system size, the catalog, and various other factors (step 408).

The appropriate delivery type includes either the full delivery, the minimal delivery, or the service bundle. Again, the ultimate goal would always be to perform a full delivery of the software release, but this is not feasible given constraints in the network element 200 and the controller 300. The process 400 here is automatically making a decision based on the various factors to determine how to optimally deliver the software release.

The goal of the process 400 is to accommodate different configurations for the network elements 200 and the controllers 300. The process 400 has the ability to deliver the software release using three options—the full delivery, the minimal delivery, or the service bundle. The first option is a full delivery, delivering all the loads included in the release. The second option is a minimal delivery, which only delivers the loads absolutely required for the given configuration, or cards present in the shelf. The third option allows flexibility to choose service bundles that they want to see delivered, each bundle containing the loads for a given family of cards, grouped by service type.

Once the delivery type is determined, the process 400 checks to make sure the recommended delivery can be accommodated in the file system of the controller 300 (step 410), and if so, the process 400 includes delivering the software release to the network element 200, i.e., to the controller 300, using the determined delivery type (step 412). If the file system cannot accommodate the software release (step 410), the process 400 end (step 406).

The present disclosure includes automation and intelligence to remove human/manual input. The present disclosure provides a recommendation of the delivery type based primarily on the release catalog, the software load size, the modules present/expected, and the available file system size. In an embodiment, a user can select, in a GUI, a delivery type of "optimal delivery," and the process 400 automatically determines the delivery type. This can be a recommendation to the user that is accepted or not. The present disclosure delegates this selection of the delivery type to the network element 200 based on the "to" release load recommendation. With proper testing and characterization, the "to" release can have an accurate picture of which delivery type suits each network element 200 best and can make that information available to the "from" release. As such, the user does not need to worry about the delivery type, and the network element 200 can control the software load delivery when the new load is released to the network 100.

That is, the software load delivery technique is driven by the "to" release catalog information, and this is made available to the "from" release, i.e., the release currently operating. The selection of the software load delivery technique can be by the network element 200, the controller 300, or the management system 170. The determination can be predefined in terms of different types of controllers 300. For example, with a finite number of "from" releases and "to" releases and a finite number of different types of controllers 300, it is possible to provide a mapping between each of these with an output being the optimal delivery technique.

Further, the process 400 can be implemented for multiple shelf configurations where the process 400 determines the software load delivery technique for the primary controller 300 as well as for the member shelf controllers 300.

For illustration, assume an example where a network element 200 is being updated from release A to B. In an embodiment, the "to" release catalog includes a recommended delivery technique mapping based on a type of controller 300. Also, in another embodiment, the software load delivery technique decision can be made by the controller 300 after receiving the "to" catalog. Other embodiments are contemplated. Specifically, the catalog can include the mapping, as well as which loads, are required for which modules. Thus, the software load delivery technique decision can be made based on a lookup table.

Once the software load has been delivered to a network element 200, the network element 200 can be upgraded using various techniques known in the art. Of note, a software upgrade of a network element 200 is typically performed in-service, in a maintenance window, etc. That is, the software upgrade does not take a network element 200 out of service and is not traffic affecting.

Post-Upgrade Software Activities

The various descriptions provided so far have focused on software load delivery in the context of file system size constraints. Of note, pre-upgrade, the controller 300 needs to have at least two software releases stored thereon, namely the "from" release, which is currently operating, and the "to" release, which is the planned upgrade. Once the upgrade is complete, there are further activities "to clean up."

The following description provides examples of post-upgrade software delivery activities for different types of network elements 200. As described herein, the network element 200 has been upgraded from the "from" release to the "to" release. That is, the post-upgrade software activities are everything after the actual upgrade is performed.

Once the "to" release is upgraded and operating, a full software delete of the "from" release is performed on the controller 300 file system. The same can be performed if there is a redundant (protection) controller 300 present and provisioned, as well as on member shelf controllers 300 in a multi-shelf configuration.

The optimal delivery can translate into different delivery types for different types of controllers 300. The optimal delivery behavior can also be different in pre-upgrade and post-upgrade delivery for controller 300. That is, once the "from" release is removed, there is additional controller 300 file system space available for a possible secondary software delivery. That is, there can be a pre-upgrade delivery to enable an upgrade between a "from" release and a "to" release and then a post-upgrade delivery to deliver more of the "to" release, when the file system constraints are relaxed. That is, the file system has a constraint of requiring two loads simultaneously pre-upgrade. Post-upgrade, the file system can delete the "from" release which frees up file system space.

For example, assume there are five different types of controllers 300 (e.g., different file system sizes). Here are some examples of the different behaviors:

| Controller type | Pre-upgrade delivery behavior | Post-upgrade delivery behavior |
| --- | --- | --- |
| Controller Type 1 | Minimal | Full |
| Controller Type 2 | Minimal | Service bundle |
| Controller Type 3 | Full | Full |
| Controller Type 4 | Service bundle | Service bundle |
| Controller Type 5 | Service bundle | Full |

As this feature evolves, it is possible to add more detailed information in the catalog of the release being delivered that will direct the software currently running on the shelf to make the right delivery determinations. Deliveries could be optimal based on the shelf configuration, or the bandwidth available to the server where the release is being delivered from (for instance).

Process

Figure 5:
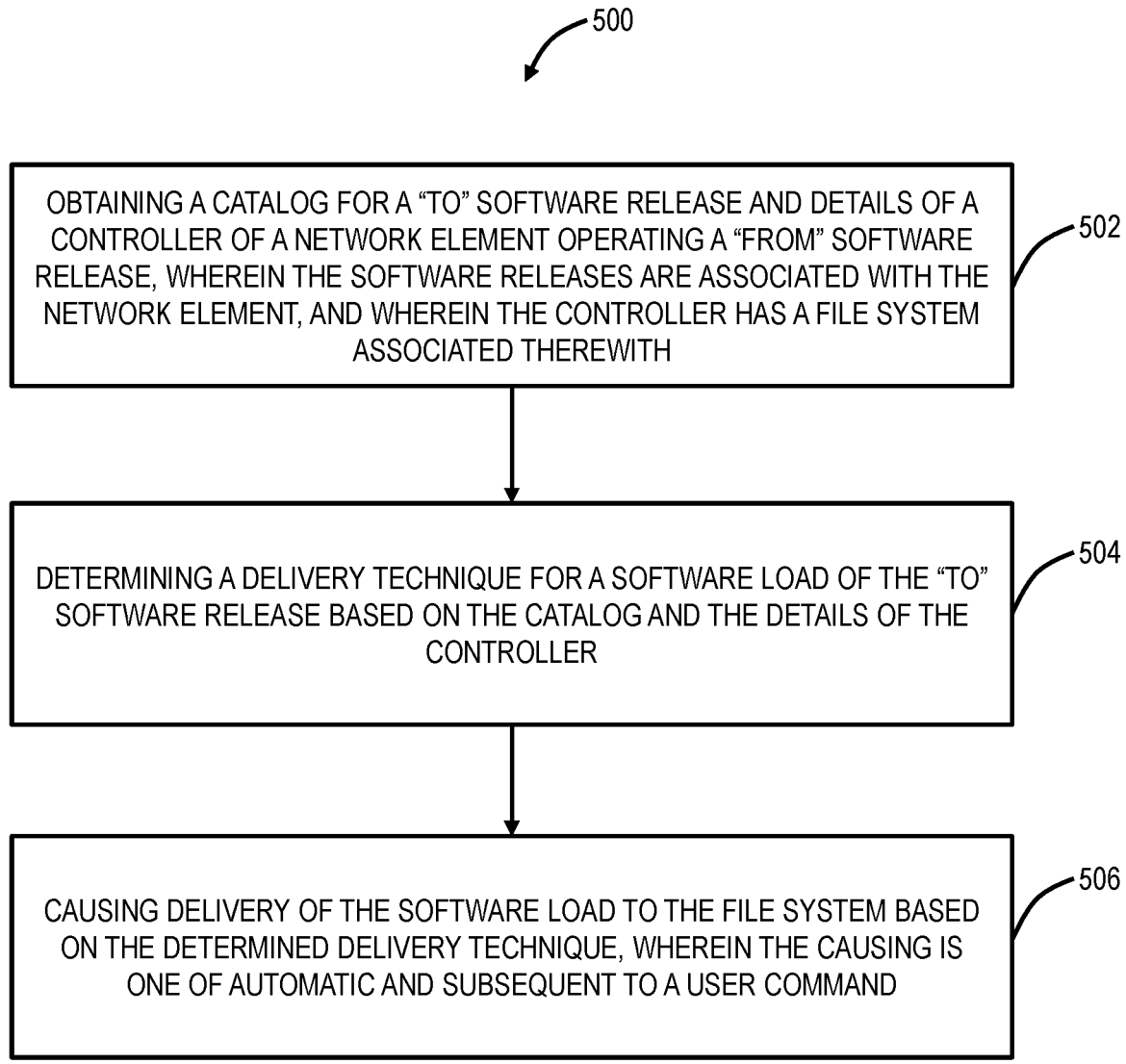
FIG. 5 is a flowchart of a process for optimal software release delivery in accordance with the systems and methods described herein.

FIG. 5 is a flowchart of a process 500 for optimal software release delivery in accordance with the systems and methods described herein. The process 500 can be implemented on the release server, the management system 170, the controller 300, the network element 200, etc. Further, the process 500 can be a computer-implemented method as well as embodiment as computer readable code stored on a non-transitory computer-readable storage medium.

The process 500 includes obtaining a catalog for a "to" software release and details of a controller of a network element operating a "from" software release, wherein the software releases are associated with the network element, and wherein the controller has a file system associated therewith (step 502); determining a delivery technique for a software load of the "to" software release based on the catalog and the details of the controller (step 504); and causing delivery of the software load to the file system based on the determined delivery technique, wherein the causing is one of automatic and subsequent to a user command (step 506). Note, the process 500 can be implemented at either a remote location (e.g., the management system 170, a release server, etc.) or at the network element 200 (e.g., via the controller 300). The causing step 506 can be automatic or subsequent to a user command, e.g., via a user prompt. Note, the delivery is directional, i.e., from the release server (or the management system 170) to the network element 200.

The delivery technique is one of i) a full delivery of the software load, including all files in the catalog, ii) a minimal delivery of the software load, including only files in the catalog needed based on modules present in the network element, and iii) a hybrid delivery of the software load between the full delivery and the minimal delivery, including the only files and extra files for modules not present in the network element.

The process 400 can further include, subsequent to an upgrade of the network element to the "to" software release and removal of the "from" software release from the file system, performing a second delivery of the software load with at least one file not delivered with the determined delivery technique. The hybrid delivery can be based on a service bundle where files in the catalog are provided based on modules used with the service bundle. The service bundle can be based on a type of the network element, including any of a switch (e.g., packet, OTN, etc.), a router, and a photonic (WDM) terminal.

The catalog is a file used to describe contents of the "to" software release with list of supported modules and defining what loads belong on the modules. The controller can be a type of a plurality of controller types, each type having a different size of the file system, and wherein the determining is based in part on the corresponding size of the file system. The obtaining can be performed by the network element 200, as well as by any of the management system 170 and a release server.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, one or more processors, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming a processor to perform steps of:
   obtaining a catalog for a "to" software release and details of a controller of a network element operating a "from" software release, wherein the software releases are associated with the network element, and wherein the controller has a file system associated therewith;
   determining a delivery technique for a software load of the "to" software release based on the catalog and the details of the controller including available memory, and further based on evaluating factors of the network element including present modules, growth expectations that includes which modules may be added, and a type of the network element; and
   causing delivery of the software load to the file system based on the determined delivery technique, wherein the causing is one of automatic and subsequent to a user command.

2. The non-transitory computer-readable storage medium of claim 1, wherein the delivery technique is one of i) a full delivery of the software load, including all files in the catalog, ii) a minimal delivery of the software load, including only files in the catalog needed based on modules present in the network element, and iii) a hybrid delivery of the software load between the full delivery and the minimal delivery, including the only files and extra files for modules not present in the network element.

3. The non-transitory computer-readable storage medium of claim 2, wherein the steps further include
   subsequent to an upgrade of the network element to the "to" software release and removal of the "from" software release from the file system, performing a second delivery of the software load with at least one file not delivered with the determined delivery technique.

4. The non-transitory computer-readable storage medium of claim 2, wherein the hybrid delivery is based on a service bundle where files in the catalog are provided based on modules used with the service bundle.

5. The non-transitory computer-readable storage medium of claim 4, wherein the service bundle is based on a type of the network element, including any of a switch, a router, and a photonic terminal.

6. The non-transitory computer-readable storage medium of claim 1, wherein the catalog is a file used to describe contents of the "to" software release with list of supported modules and defining what loads belong on the modules.

7. The non-transitory computer-readable storage medium of claim 1, wherein the controller is a type of a plurality of controller types, each type having a different size of the file system, and wherein the determining is based in part on the corresponding size of the file system.

8. The non-transitory computer-readable storage medium of claim 1, wherein the obtaining is performed by the network element.

9. The non-transitory computer-readable storage medium of claim 1, wherein the obtaining is performed by any of a management system and a release server.

10. A system comprising:
    a processor; and
    memory comprising instructions that, when executed, cause the processor to
    obtain a catalog for a "to" software release and details of a controller of a network element operating a "from" software release, wherein the software releases are associated with the network element, and wherein the controller has a file system associated therewith;

determine a delivery technique for a software load of the "to" software release based on the catalog and the details of the controller including available memory, and further based on evaluating factors of the network element including present modules, growth expectations that includes which modules may be added, and a type of the network element; and cause delivery of the software load to the file system based on the determined delivery technique, wherein the delivery is one of automatic and subsequent to a user command.

11. The system of claim 10, wherein the delivery technique is one of i) a full delivery of the software load, including all files in the catalog, ii) a minimal delivery of the software load, including only files in the catalog needed based on modules present in the network element, and iii) a hybrid delivery of the software load between the full delivery and the minimal delivery, including the only files and extra files for modules not present in the network element.

12. The system of claim 11, wherein the instructions that, when executed, further cause the processor to subsequent to an upgrade of the network element to the "to" software release and removal of the "from" software release from the file system, perform a second delivery of the software load with at least one file not delivered with the determined delivery technique.

13. The system of claim 11, wherein the hybrid delivery is based on a service bundle where files in the catalog are provided based on modules used with the service bundle.

14. The system of claim 10, wherein the catalog is a file used to describe contents of the "to" software release with list of supported modules and defining what loads belong on the modules.

15. The system of claim 10, wherein the controller is a type of a plurality of controller types, each type having a different size of the file system, and wherein the determining is based in part on the corresponding size of the file system.

16. The system of claim 10, wherein the system is located in the network element.

17. The system of claim 10, wherein the system is any of a management system and a release server.

18. A method comprising:

obtaining a catalog for a "to" software release and details of a controller of a network element operating a "from" software release, wherein the software releases are associated with the network element, and wherein the controller has a file system associated therewith;

determining a delivery technique for a software load of the "to" software release based on the catalog and the details of the controller including available memory, and further based on evaluating factors of the network element including present modules, growth expectations that includes which modules may be added, and a type of the network element; and causing delivery of the software load to the file system based on the determined delivery technique, wherein the causing is one of automatic and subsequent to a user command.

19. The method of claim 18, wherein the delivery technique is one of i) a full delivery of the software load, including all files in the catalog, ii) a minimal delivery of the software load, including only files in the catalog needed based on modules present in the network element, and iii) a hybrid delivery of the software load between the full delivery and the minimal delivery, including the only files and extra files for modules not present in the network element.

20. The method of claim 18, further comprising subsequent to an upgrade of the network element to the "to" software release and removal of the "from" software release from the file system, performing a second delivery of the software load with at least one file not delivered with the determined delivery technique.

* * * * *